Sept. 8, 1959 — I. GONETZ — 2,903,532

FLUID LEAK DETECTORS

Filed Jan. 22, 1959

INVENTOR.
IRVING GONETZ
BY *Kleinberg & Lilling*
ATTORNEYS

United States Patent Office 2,903,532
Patented Sept. 8, 1959

2,903,532
FLUID LEAK DETECTORS
Irving Gonetz, Brooklyn, N.Y.
Application January 22, 1959, Serial No. 788,357
5 Claims. (Cl. 200—84)

The invention here presented is an improvement over my copending application, Serial No. 741,816, now abandoned, and is broadly in the field of leak detectors for hydraulic systems and more specifically it presents a device to automatically signal and thereby call the attention of the operator of a vehicle to a loss of fluid in the brake hydraulic system.

It is common in vehicles such as automobiles, trucks and buses to provide a hydraulically operated brake system. The special brake fluid is supplied to the system through a master cylinder. The system is generally complex and is provided with numerous fittings, seals and packing glands, so that inherently it most have leaks after extended use. Furthermore, the brake fluid is usually a light viscous fluid which is capable of leaking past a seal in minute quantities, thereby remaining undetected.

If the loss of fluid is not called to the attention of the operator, the brake system may suddenly become inoperative and result in a disaster.

While hydraulic fluid leak detectors are well known, their construction has been complicated by the incorporation of switches which may easily go out of order because of constant use and by expensive alarm indicators.

It is a primary object of this invention, therefore, to provide a float actuated brake leak detector which is simple and economical in construction, and which is comprised of relatively few parts. It thus could be sold for a fraction of more intricate and more expensive leak detectors, making it available to not only new cars and trucks but to the older vehicles on the road.

It is another object of this invention to provide a device which will indicate a low hydraulic fluid supply which does not pass electrical current unless and until the fluid supply is low.

Still another object is to provide a leak detector which may be easily installed or removed.

A further object is to provide a device which will conveniently allow the operator to visually check the level of the brake hydraulic fluid without removing any plugs, adapters or similar parts.

With these objects in view, the invention consists of the novel features of construction and arrangement of parts which will appear in the following specification and recited in the appended claims, reference being had to the accompanying drawings in which the same reference numerals indicate the same parts throughout the various figures, in which:

Figure 1:
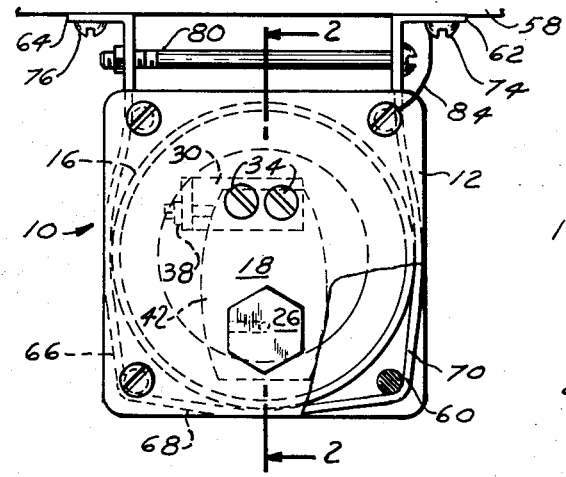
Figure 1 is a plan view of the invention with the top cover plate partially cut away.

I have illustrated generally a hydraulic brake leak detector 10 consisting primarily of a top cover plate 12, a bottom cover plate 14, a transparent housing 16 and a float and switch combination 18.

The top and bottom metal cover plates 12 and 14 are clamped to the transparent housing 16 by means of bolts 20 and nuts 21. A gasket 22 may be provided between the top cover plate 12 and the transparent housing 16 and another gasket 24 may be provided between the bottom cover plate 14 and the transparent housing 16 to insure a leak proof construction. In the assembly, the bolts 20 and nuts 21 are securely torqued and should be locked by any suitable means (not illustrated).

It will thus be apparent that the interior of the device can be visually observed to determine the level of the hydraulic brake fluid by eye.

The top metallic cover plate 12 is provided with a relatively large plug 26. When plug 26 is removed, hydraulic fluid may be poured through the resulting top opening 28 to fill this device and the brake system master cylinder (not illustrated) with fluid.

The top metallic cover plate 12 further supports a sheet metal bracket 30. Bracket 30 may be secured to the top cover plate 12 by a pair of nuts and bolts 32 and 34 and is formed into substantially a right angle so that a leg 36 extends vertically downwards as illustrated. Fastened to the lower portion of leg 36 is a bushing 38. Rotatably held by bushing 38 is the metallic float supporting shaft 40. The float 42 is a substantially hollow container of conductive material comprised of an upper half 44 and a lower half 46 secured together into one unitary construction. The float 42 is rigidly fastened at one end to the shaft 40 as by welding, so that it is not balanced.

Figure 2:
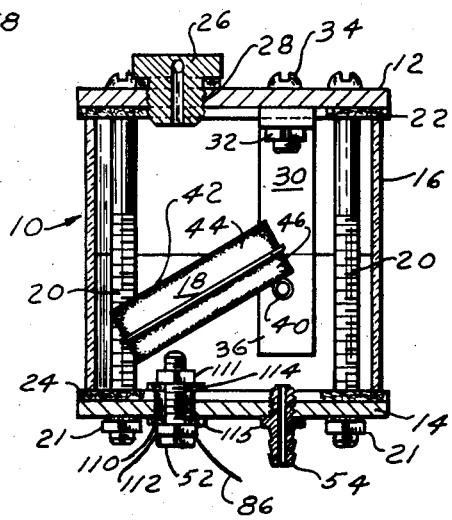
Figure 2 is a side view taken substantially along line 2—2 of Figure 1.
Figure 3:
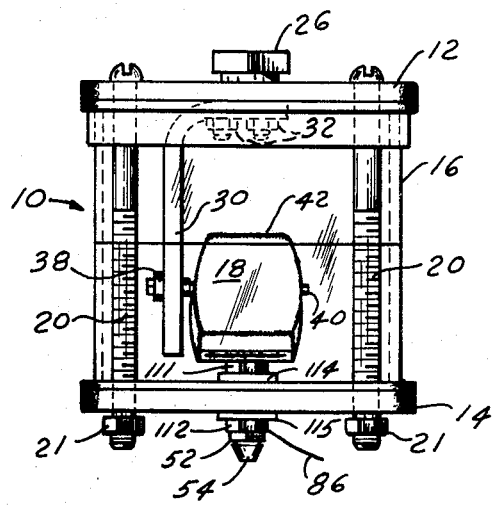
Figure 3 is a front elevational view of the device.

It is obvious therefore that when there is a minimum of fluid in the device, the float will be tipped in a downward direction as illustrated most clearly in Figure 2. However, when the level of the hydraulic fluid is raised, the float will rise and assume a horizontal position or even be tipped upwards.

Integrally fastened to the bottom cover plate 14 is a metallic contact 52 projecting in an upwards fashion directly underneath the unbalanced end of float 42. Metallic contact 52 passes through a larger hole 110 in the bottom cover plate 14. It is preferably fastened to the bottom cover plate 14 by means of upper and lower locking nuts 111 and 112 threadingly fastened to metallic contact 52. Upper and lower locking nuts 111 and 112 are separated from bottom cover plate 14 by means of insulating gaskets 114 and 115. Since metallic contact 52 is located in the center of larger hole 110 in bottom cover plate 14, there is no electrical contact between the metallic contact 52 and the remainder of the device unless and until float 42 is allowed to depress and make physical contact with the top portion of metallic contact 52 as illustrated most clearly in Figure 2. Metallic contact 52 may be separated from the wall of larger hole 110 by means of an insulating bushing or liner. The lead wire 86 is fastened by any suitable means to the lower or external portion of contact 52.

Figure 4:
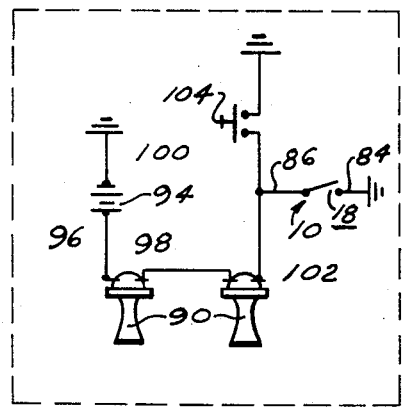
Figure 4 is a diagrammatic view of the electrical circuit.

Wire 86 is spliced into the horn circuit as illustrated diagrammatically in Figure 4. The horn circuit usually consists of one or more horns 90. One pole of battery 94 is electrically connected to one terminal 98 of the horn 90. The other terminal 100 of the battery 94 is grounded. The other terminal 102 of the horn 90 is also grounded but through the normally open horn button 104. When the horn button 104 is depressed, the electrical circuit is completed and the horn 90 sounds.

The bottom cover plate 14 is provided with a nipple 54 to receive a flexible hose leading to the master cylinder (not illustrated).

It is contemplated that this device will generally be fastened to the motor side of the vehicle firewall 58 as directly as possible above the master cylinder. It is further contemplated that the simple direct bracket arrangement illustrated in Figure 1 be utilized. This arrangement is comprised merely of a thin metal strip 60 forming flanges 62 and 64 and surrounding side portions 66, 68 and 70. As illustrated, the metal strip 60 is wrapped around three sides of the device and fastened to the firewall 58 by bolts 74 and 76. A long bolt 80 may be provided passing through the ends of side portions 66 and 70 and when torqued will tighten the metal strip 60 to form a rigid clamp.

The lead wire 84 may be fastened between the top cover plate and the firewall 58 insuring grounding of all components of the entire device except for contact 52 which as hereinbefore described is insulated from the remainder of the mechanism except when contacted by float 42.

The mode of operation of the device then is as follows:

The plug 26 is removed and hydraulic fluid is poured through opening 28 thereby filling the master cylinder and this device 10. The plug 26 is then locked in place.

While the device 10 is substantially filled with fluid, the float will be in the horizontal or above horizontal position. The switch combination 18 comprised of the float 42 and the metallic contact 52 therefore will be in the "off" or no current position, so that the horn 90 can only be sounded by the horn button 104. However, when the hydraulic fluid level is low, the float 42 descends to the downward position, thereby touching metallic contact 52, completing the horn circuit and causing the horn 90 to sound. This alerts the driver to the dangere of a low hydraulic fluid supply.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

Having thus described my invention and illustrated its use, what I claim as new and desire to secure by Letters Patent is:

1. A hydraulic fluid brake leak detector comprising, in combination: A top cover plate and a bottom cover plate, a cylindrical housing; bolts securing said top cover plate and said bottom plate together with said cylindrical housing clamped therebetween; and a bracket secured to the underside of said top cover plate, said bracket having at least one vertical leg extending partially into said cylindrical housing; and a float in said cylindrical housing, means pivotally connecting said float to said vertical leg; and a switch, said float comprising one part of said switch.

2. A hydraulic fluid brake leak detector comprising, in combination: A top cover plate and a bottom cover plate, a transparent cylindrical housing; bolts securing said top cover plate and said bottom cover plate together with said transparent cylindrical housing therebetween; and a bracket secured to the underside of said top cover plate, said bracket formed in a right angle so that at least one leg extends partially through said cylindrical housing; and a float in said cylindrical housing, means pivotally connecting said float to said vertical leg for movement about a horizontal axis; and a switch, said float comprising one part of said switch.

3. A hydraulic fluid brake leak detector comprising, in combination: A top cover plate and a bottom cover plate, a cylindrical housing; bolts securing said top cover plate and said bottom plate together with said cylindrical housing clamped therebetween; and a bracket secured to the underside of said top cover plate, said bracket having at least one vertical leg extending partially into said cylindrical housing; and a float in said cylindrical housing, means pivotally connecting said float to said vertical leg; and a switch, said float comprising a part of said switch; and hydraulic fluid inlet means in said bottom cover plate so that the level of the fluid in the brake hydraulic system will be reflected in the housing.

4. A hydraulic fluid brake leak detector comprising, in combination: A top cover plate and a bottom cover plate, a cylindrical housing; bolts securing said top cover plate and said bottom plate together with said cylindrical housing clamped therebetween; and a bracket secured to the underside of said top cover plate, said bracket having at least one vertical leg extending partially into said cylindrical housing; and a float in said cylindrical housing, means pivotally connecting said float to said vertical leg; and a switch, said float comprising a part of said switch; so that a tilting of the float resulting from a drop in the hydraulic brake fluid level will result in said switch closing thereby completing the horn circuit and alarming the operator.

5. A hydraulic fluid brake leak detector comprising in combination: A conductive top cover plate and a conductive bottom cover plate, a cylindrical housing, bolts securing said top cover plate and said bottom cover plate with said cylindrical housing clamped therebetween; and a conductive bracket secured to the underside of said top cover plate, said bracket having at least one vertical leg extending partially into said cylindrical housing; and a conductive float in said cylindrical housing, conductive means pivotally connecting said float in an unbalanced manner to said vertical leg; and a metallic contact disposed directly under said float, said metallic contact insulated from the remainder of all components of the device except said float; so that a tilting of the float resulting from a drop in the hydraulic brake fluid level will result in a completing of an electrical contact between said float and said metallic contact.

References Cited in the file of this patent

UNITED STATES PATENTS

| 1,529,470 | Dowd | Mar. 10, 1925 |
| 2,616,004 | Richards | Oct. 28, 1952 |
| 2,866,866 | Laplante | Dec. 30, 1958 |